United States Patent
Shimmura

(10) Patent No.: US 10,589,362 B2
(45) Date of Patent: Mar. 17, 2020

(54) POST-INSTALLED ANCHOR

(71) Applicant: ANCHOR BIRDS CO., LTD., Shizuoka (JP)

(72) Inventor: Chikara Shimmura, Shizuoka (JP)

(73) Assignee: ANCHOR BIRDS CO., LTD., Shizuoka (JP)

( * ) Notice: Subject to any disclaimer, the term of this patent is extended or adjusted under 35 U.S.C. 154(b) by 231 days.

(21) Appl. No.: 15/629,198

(22) PCT Filed: Jan. 6, 2016

(86) PCT No.: PCT/JP2016/050197
§ 371 (c)(1),
(2) Date: Jun. 21, 2017

(87) PCT Pub. No.: WO2016/111304
PCT Pub. Date: Jul. 14, 2016

(65) Prior Publication Data
US 2017/0291227 A1    Oct. 12, 2017

(30) Foreign Application Priority Data
Jan. 7, 2015    (JP) ................. 2015-001394

(51) Int. Cl.
*F16B 13/00* (2006.01)
*B23B 51/00* (2006.01)
(Continued)

(52) U.S. Cl.
CPC ............ *B23B 51/0045* (2013.01); *E04B 1/41* (2013.01); *E04B 1/5825* (2013.01);
(Continued)

(58) Field of Classification Search
CPC .... F16B 13/00; F16B 13/002; F16B 13/0833; F16B 13/0858; F16B 13/124;
(Continued)

(56) References Cited

U.S. PATENT DOCUMENTS 2,379,786 A * 7/1945 Bugg ............. F16B 37/00
411/80.6
2,455,885 A * 12/1948 Theurer .......... F16B 37/122
411/80.2
(Continued)

FOREIGN PATENT DOCUMENTS

| CN | 1636097 A | 7/2005 |
| CN | 201221517 Y | 4/2009 |

(Continued)

OTHER PUBLICATIONS

Office Action of Chinese Patent Application No. 201680005076.0 dated Sep. 17, 2018 (6 sheets).
(Continued)

*Primary Examiner* — Roberta S Delisle
(74) *Attorney, Agent, or Firm* — Kratz, Quintos & Hanson, LLP

(57) ABSTRACT

To provide a post-installed anchor capable of being used repeatedly and being easily removed and recovered.
A post-installed anchor to be inserted and fixed in an anchor insertion hole formed in a structure includes: a cylindrical anchor body; expandable pieces obtained by dividing the tip side of the anchor body into a plurality of pieces by a plurality of slits 16 which are formed on the tip side, leaving equal intervals in a circumferential direction and extending in the axial direction of the anchor body, the expandable pieces each having a plate-like part whose surface is formed into a flat surface and which has spring force, a fixing part formed at the tip of the expandable piece and having a larger thickness than that of the plate-like part, and an inclined part whose inner surface is gradually inclined inward toward the tip of the expandable piece; a female screw formed in an inner surface of an unexpandable part side of the anchor body; and a male screw body formed into a substantially columnar shape that can be inserted into the anchor body,
(Continued)

having a wedge part with a truncated conical shape at its tip, having a male screw screwed with a female screw formed in the anchor body at its rear end side, and having a rotary tool engagement part at its rear end surface. The male screw body is advanced with the male screw of the male screw body screwed with the female screw of the anchor body to make the truncated conical shaped wedge part at the tip of the male screw body abut against the inclined part formed so that the inner surface thereof is gradually inclined inward toward the tip side of the expandable piece to expand the expandable piece by wedge action, pressing the outer surface of the fixing part against the hole wall of the anchor insertion hole, which thereby fixes the post-installed anchor in the anchor insertion hole, and the male screw body is retracted to close the expanded expandable piece by spring force of the plate-like part of the expandable piece for recovery and reuse.

7 Claims, 6 Drawing Sheets

(51) Int. Cl.
  *F16B 37/12* (2006.01)
  *F16B 13/08* (2006.01)
  *F16B 13/12* (2006.01)
  *E04B 1/41* (2006.01)
  *E04B 1/58* (2006.01)
  *F16B 13/14* (2006.01)

(52) U.S. Cl.
  CPC ........ *F16B 13/002* (2013.01); *F16B 13/0833* (2013.01); *F16B 13/0858* (2013.01); *F16B 13/124* (2013.01); *F16B 37/122* (2013.01); *E04B 2001/5887* (2013.01); *F16B 13/00* (2013.01); *F16B 13/141* (2013.01)

(58) Field of Classification Search
  CPC .. F16B 13/141; F16B 37/122; B23B 51/0045; E04B 1/41; E04B 1/5825; E04B 2001/5887
  USPC .......... 411/44, 45, 51, 54, 55, 57.1, 60.2, 63
  See application file for complete search history.

(56) References Cited

U.S. PATENT DOCUMENTS

| | | | | |
|---|---|---|---|---|
| 4,135,432 | A | | 1/1979 | Schalge |
| 4,564,324 | A | * | 1/1986 | Leibhard .................. B22F 5/00 411/3 |
| 5,065,490 | A | * | 11/1991 | Wivagg .............. F16B 19/1081 24/297 |
| 5,356,252 | A | * | 10/1994 | Whistler, III .......... F16B 13/06 411/45 |
| 6,428,256 | B2 | * | 8/2002 | Wieser .................. F16B 13/124 411/55 |
| 6,896,460 | B2 | * | 5/2005 | Enomoto ............ F16B 19/1081 411/41 |
| 6,908,271 | B2 | * | 6/2005 | Breslin ................. F16B 13/126 411/271 |
| 7,993,085 | B2 | * | 8/2011 | McClure ............... F16B 13/124 411/55 |
| 8,430,614 | B2 | | 4/2013 | Ito |
| 8,434,980 | B2 | * | 5/2013 | Hsu ..................... F16B 13/0858 411/45 |
| 8,517,650 | B2 | * | 8/2013 | Niklewicz ............. B25B 31/005 411/271 |
| 2002/0194718 | A1 | | 12/2002 | Yekutiely et al. |
| 2005/0169726 | A1 | * | 8/2005 | McClure ............. F16B 19/1081 411/55 |
| 2010/0129172 | A1 | * | 5/2010 | Gottlich ................ F16B 13/126 411/63 |
| 2011/0008124 | A1 | | 1/2011 | Niklewicz |
| 2011/0038683 | A1 | | 2/2011 | Ito |

FOREIGN PATENT DOCUMENTS

| | | |
|---|---|---|
| CN | 202194901 U | 4/2012 |
| CN | 104160162 A | 11/2014 |
| JP | 2004-339797 A1 | 12/2004 |
| JP | 2005-146715 A1 | 6/2005 |
| JP | 2005-290854 A | 10/2005 |
| JP | 2012-184581 A1 | 9/2012 |
| JP | 2012-233490 A1 | 11/2012 |
| JP | 2013-112985 A1 | 6/2013 |
| JP | 2014-237988 A1 | 12/2014 |
| WO | 2009/128171 A1 | 10/2009 |

OTHER PUBLICATIONS

European Search Report for corresponding European Patent Application No. 16735043.8, dated Jul. 13, 2018 (6 Sheets).
Singaporean Search Report for counterpart SG-patent application No. 11201704697S, dated Apr. 17, 2018 (9 Sheets).
Japanese Office Action for JP Patent Application No. 2015-001394 dated Mar. 16, 2016 (3 Sheets).
International Search Report for International Application No. PCT/JP2016/050197 dated Mar. 22, 2016 (1 Sheet).

* cited by examiner (a)

(b)

(c)

(a)

(b)

(c)

POST-INSTALLED ANCHOR

TECHNICAL FIELD

The present invention relates to a post-installed anchor to be inserted and fixed in an anchor insertion hole formed in a structure and, more particularly, to a post-installed anchor that can be recovered and reused.

BACKGROUND ART

Conventionally, there are various types of post-installed anchors available which are each to be inserted and fixed in an anchor insertion hole formed in a structure such as an existing concrete structure. For example, JP 2012-233490A discloses a post-installed anchor which is formed by subjecting a single pipe material to pressure-forging and is a one-piece product including a first bolt part and a second bolt part connected by a connecting part. The first bolt part has a tapered part formed by pressure-forging to reduce the diameter of the pipe material. The second bolt part is shaped by pressure-forging to have four slits and a concavo-convex part at a bolt top, in which an inner circumferential wall in aback face area of the concavo-convex part serves as a guide face to be joined with an outer circumferential face of the tapered part. The connecting part is a vestige of forging to connect the first bolt part and the second bolt part at the bolt top, and is thin and rupturable.

Further, JP 2012-184581A discloses a post-installed anchor which includes a cylindrical body part, an expandable part having a plurality of slits formed on the tip side of the body part, leaving a prescribed interval in a circumferential direction and extending in an axial direction, a female screw formed in the inner surface of the expandable part, and a male screw body screwed with the female screw. The inner surface of the expandable part in which the female screw is formed is tapered toward the side at which the expanded expandable part closes as the male screw body is retracted. By screwing the male screw body into the female screw and advancing the male screw body toward the tip side of the body part, the expandable part is opened and expanded, and the expandable part closes as the male screw body is retracted.

CITATION LIST

Patent Document

Patent Document 1: JP 2012-233490A
Patent Document 2: JP 2012-184581A

DISCLOSURE OF THE INVENTION

Problems to be Solved by the Invention

However, the post-installed anchor disclosed in Patent Document 1 cannot be reused when it is removed and recovered from a structure after being used once.

The post-installed anchor disclosed in Patent Document 2 has a configuration in which the expandable part closes as the male screw body is retracted; however, plastic deformation remains due to pressure generated when the expandable part is opened and expanded, preventing smooth recovery of the anchor.

The object of the prevent invention is to provide a post-installed anchor capable of solving the problems of the conventional post-installed anchors, that is, capable of being used repeatedly and being easily removed and recovered.

Means for Solving the Problems

To solve the above problems, according to the present invention, there is provided a post-installed anchor to be inserted and fixed in an anchor insertion hole formed in a structure, including: a cylindrical anchor body; expandable pieces obtained by dividing the tip side of the anchor body into a plurality of pieces by a plurality of slits 16 which are formed on the tip side, leaving equal intervals in a circumferential direction and extending in the axial direction of the anchor body, the expandable pieces each having a plate-like part whose surface is formed into a flat surface and which has spring force, a fixing part formed at the tip of the expandable piece and having a larger thickness than that of the plate-like part, and an inclined part whose inner surface is gradually inclined inward toward the tip of the expandable piece; a female screw formed in an inner surface of an unexpandable part side of the anchor body; and a male screw body formed into a substantially columnar shape that can be inserted into the anchor body, having a wedge part with a truncated conical shape at its tip, having a male screw screwed with a female screw formed in the anchor body at its rear end side, and having a rotary tool engagement part at its rear end surface. The male screw body is advanced with the male screw of the male screw body screwed with the female screw of the anchor body to make the truncated conical shaped wedge part at the tip of the male screw body abut against the inclined part formed so that the inner surface thereof is gradually inclined inward toward the tip side of the expandable piece to expand the expandable piece by wedge action, pressing the outer surface of the fixing part against the hole wall of the anchor insertion hole, which thereby fixes the post-installed anchor in the anchor insertion hole, and the male screw body is retracted to close the expanded expandable piece by spring force of the plate-like part of the expandable piece for recovery and reuse.

Further, in the post-installed anchor according to the present invention, in a state where the male screw of the male screw body is screwed with the female screw to expand the fixing part of the expandable piece to thereby fix the post-installed anchor to the anchor insertion hole, a screwable part of the female screw formed in the inner surface of the anchor body remains by a predetermined length from the upper end of the male screw body.

Further, in the post-installed anchor according to the present invention, the plate-like part of the expandable piece is formed as a plate spring.

Further, in the post-installed anchor according to the present invention, the number of the expandable pieces is six.

Advantages of the Invention

There is provided a post-installed anchor to be inserted and fixed in an anchor insertion hole formed in a structure, including: a cylindrical anchor body; expandable pieces obtained by dividing the tip side of the anchor body into a plurality of pieces by a plurality of slits 16 which are formed on the tip side, leaving equal intervals in a circumferential direction and extending in the axial direction of the anchor body, the expandable pieces each having a plate-like part whose surface is formed into a flat surface and which has spring force, a fixing part formed at the tip of the expandable piece and having a larger thickness than that of the plate-like part, and an inclined part whose inner surface is gradually inclined inward toward the tip of the expandable piece; a female screw formed in an inner surface of an unexpandable part side of the anchor body; and a male screw body formed into a substantially columnar shape that can be inserted into the anchor body, having a wedge part with a truncated conical shape at its tip, having a male screw screwed with a female screw formed in the anchor body at its rear end side, and having a rotary tool engagement part at its rear end surface. The male screw body is advanced with the male screw of the male screw body screwed with the female screw of the anchor body to make the truncated conical shaped wedge part at the tip of the male screw body abut against the inclined part formed so that the inner surface thereof is gradually inclined inward toward the tip side of the expandable piece to expand the expandable piece by wedge action, pressing the outer surface of the fixing part against the hole wall of the anchor insertion hole, which thereby fixes the post-installed anchor in the anchor insertion hole, and the male screw body is retracted to close the expanded expandable piece by spring force of the plate-like part of the expandable piece for recovery and reuse. The post-installed anchor can thus be recovered and repeatedly used.

In a state where the male screw of the male screw body is screwed with the female screw to expand the fixing part of the expandable piece to thereby fix the post-installed anchor to the anchor insertion hole, a screwable part of the female screw formed in the inner surface of the anchor body remains by a predetermined length from the upper end of the male screw body. This allows a screw for supporting scaffolding or the like to be screwed with the remaining screwable part of the female screw in the inner surface of the anchor body.

By forming the plate-like part of the expandable piece as a plate spring, it is possible to impart spring force sufficient to eliminate an expanded fixed state of the fixing part to the plate-like part.

By setting the number of the expandable pieces to six, well-balanced spring force can be ensured in the plate-like parts, and well-balanced fixing force can be ensured in the fixing parts.

BEST MODE FOR CARRYING OUT THE INVENTION

Figure 1:
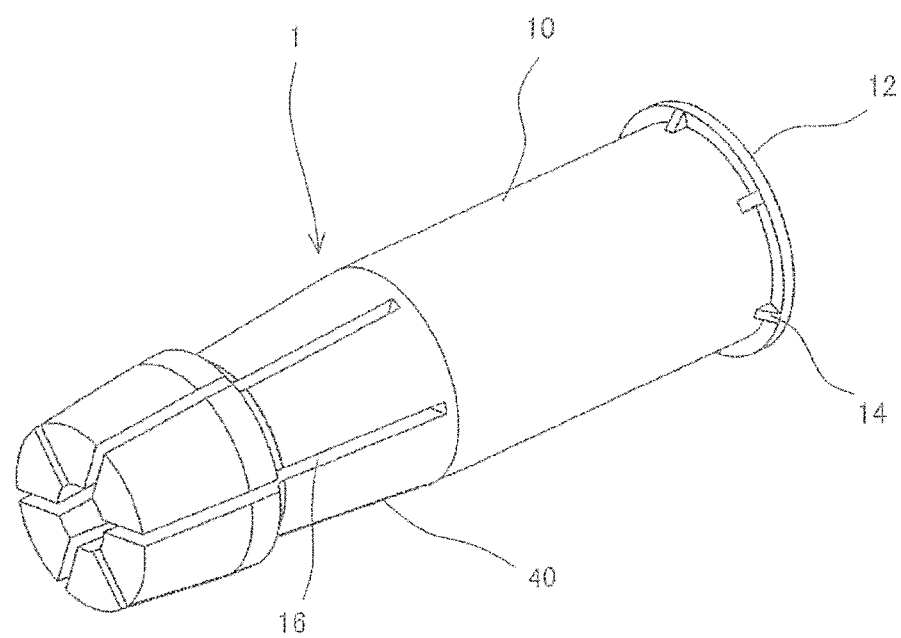
FIG. 1 is a perspective view illustrating an example of a post-installed anchor according to the present invention.
Figure 2:
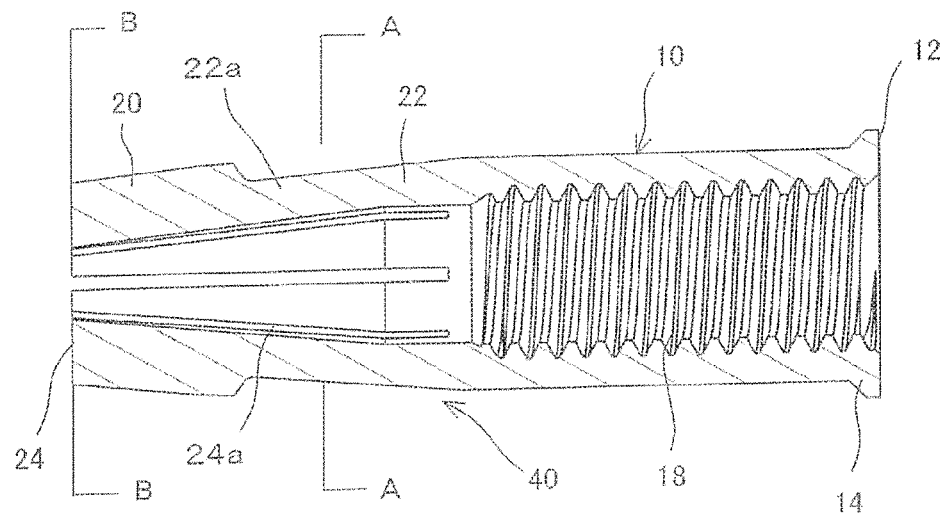
FIG. 2 is a longitudinal cross-sectional view of the post-installed anchor according to the present invention.
Figure 3:
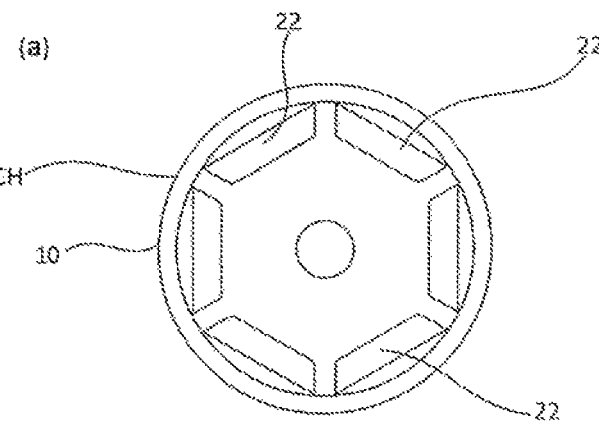
FIGS. 3A, 3B, and 3C are each a cross-sectional view taken along line A-A of FIG. 2.
Figure 3:
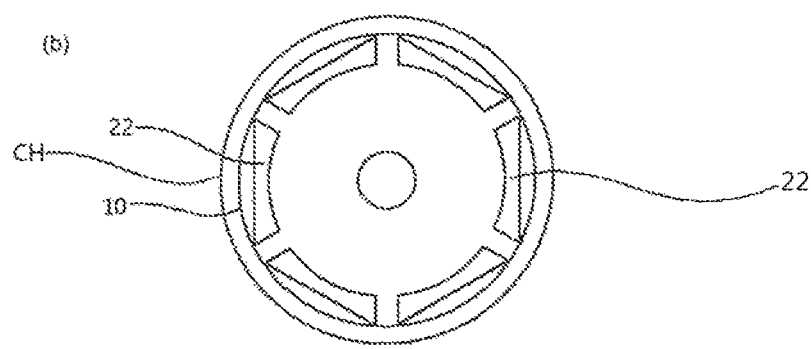
Figure 3:
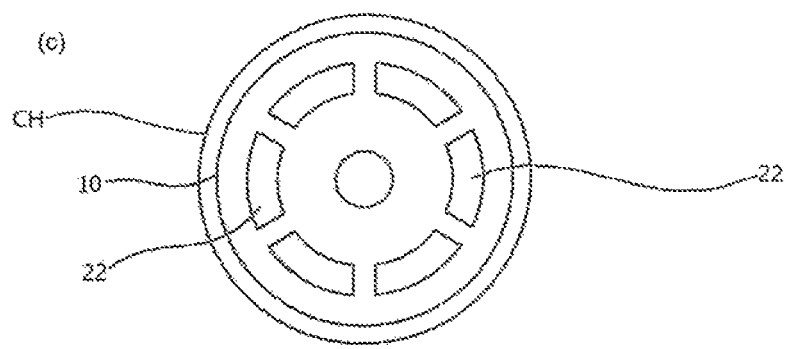
Figure 4:
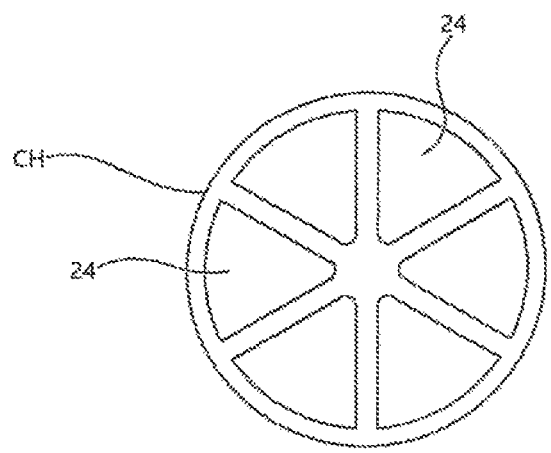
FIG. 4 is a cross-sectional view taken along line B-B of FIG. 2.

An embodiment of a post-installed anchor will be described with reference to the accompanying drawings. The post-installed anchor in the drawings is an anchor to be inserted and fixed in an anchor insertion hole formed in a structure such as an existing concrete structure. While the existing concrete structure is taken as an example in the present embodiment, an object to which a post-installed anchor 1 according to the present invention is fixed is not limited to this, but may be any structure or material such as a plaster board or a PC (Precast Concrete) panel.

The post-installed anchor according to the present invention includes a cylindrical anchor body 10 and a male screw body 30. The anchor body 10 has expandable pieces 40 obtained by dividing the tip side of the anchor body 10 into a plurality of pieces by a plurality of slits which are formed on the tip side, leaving equal intervals in a circumferential direction and extending in the axial direction of the anchor body 10. Further, a female screw 18 is formed in the inner surface of an unexpandable part of the anchor body 10. The anchor body 10 and male screw body 30 are each made of metal such as steel or resin such as reinforced resin.

A flange 12 is formed at the rear end of the anchor body 10, and a reinforcing rib 14 is formed between the flange 12 and the outer peripheral part of the anchor body 10. The flange 12 abuts around the entrance part of the anchor insertion hole formed in a structure C.

The plurality of slits 16 are formed on the tip side of the anchor body 10, leaving equal intervals and extending in the axial direction of the anchor body 10. The plurality of expandable pieces 40 are formed by the plurality of slits 16. Each expandable piece 40 includes a plate-like part 22 and a fixing part 20 formed at the tip of the plate-like part 22.

The plate-like part 22 of the expandable piece 40 is smaller in diameter than the anchor body 10 and smaller in thickness than the fixing part 20. The outer surface of the plate-like part 22 is made to be a flat or curved surface and formed so as to keep the expandable piece within the elasticity region even when it is expanded to a maximum extent and so as not to plastically deform the expandable piece even when the expanded expandable piece is closed.

The fixing part 20 of the expandable piece 40 has an inner surface 24a which is formed into a wedge surface inclined inward toward a tip part 24 side of the fixing part 20. The length of the fixing part 20 in the axial direction is set so that the fixing part 20 is securely fixed to the hole wall of the anchor insertion hole.

Although the number of the expandable pieces 40 is six in the present embodiment, it is not limited to six; however, six is preferable when considering the relationship between well-balanced spring force of the plate-like parts 20 and well-balanced fixing force of the fixing parts 20.

The female screw 18 is formed in the inner surface of the unexpandable part of the anchor body 10.

Figure 5:
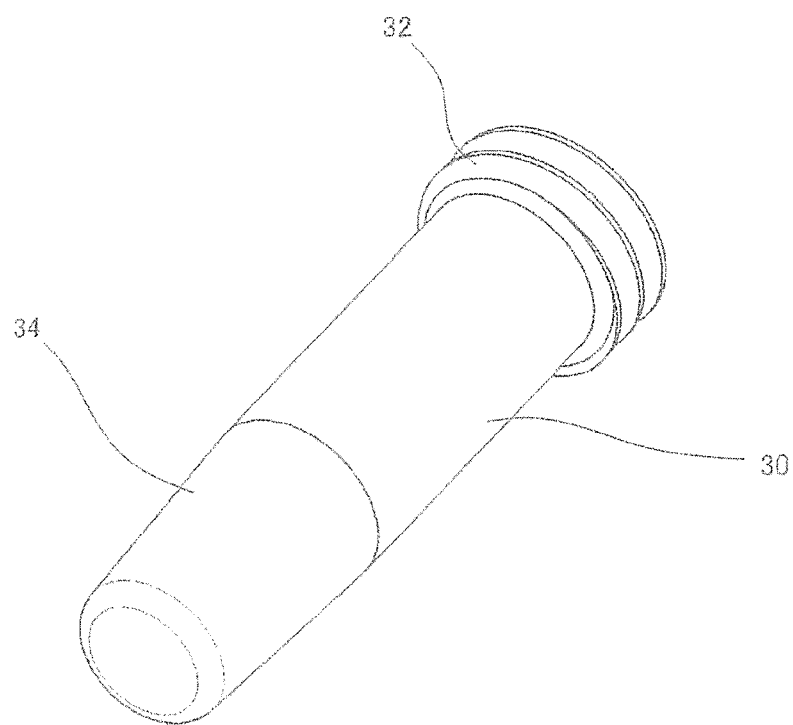
FIGS. 5A, 5B and 5C are a perspective view, a cross-sectional view, and an elevational end view of a male screw body, respectively.
Figure 5:
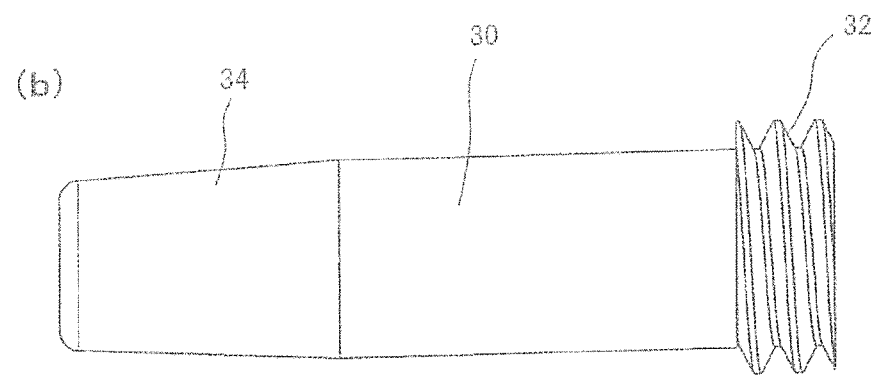
Figure 5:
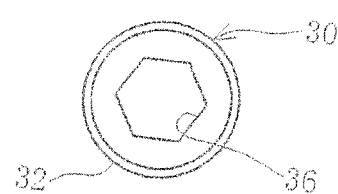

The male screw body 30 has a wedge part 34 having a truncated conical shape at its tip and has a male screw 32 screwed with the female screw 18 formed in the inner surface of the unexpandable part of the anchor body 10 at its rear end side. A rotary tool engagement part 36 for a rotary tool such as a torque wrench is formed in the rear end surface of the male screw body 30. Although the rotary tool engagement part 36 is formed into a hexagonal groove hole in the example of FIG. 5, it may be formed into a cross-shaped groove hole or other shapes.

Figure 6:
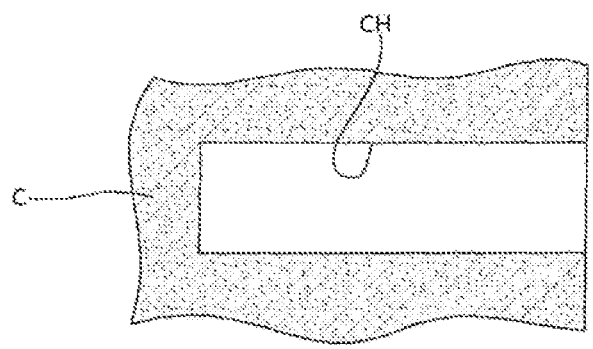
FIG. 6 is an explanatory view illustrating how to use the post-installed anchor.

The following describes how to use the thus configured post-installed anchor 1. As illustrated in FIG. 6, a drill is used to drill an anchor insertion hole CH in the concrete structure C at an insertion target position of the post-installed anchor 1. The depth of the anchor insertion hole CH is set so that the inserted post-installed anchor 1 is accommodated within the anchor insertion hole CH. The inner diameter of the anchor insertion hole CH is set slightly larger than the outer diameter of the post-installed anchor before expansion so as to facilitate insertion of the post-installed anchor 1 before expansion into the anchor insertion hole CH.

Figure 7:
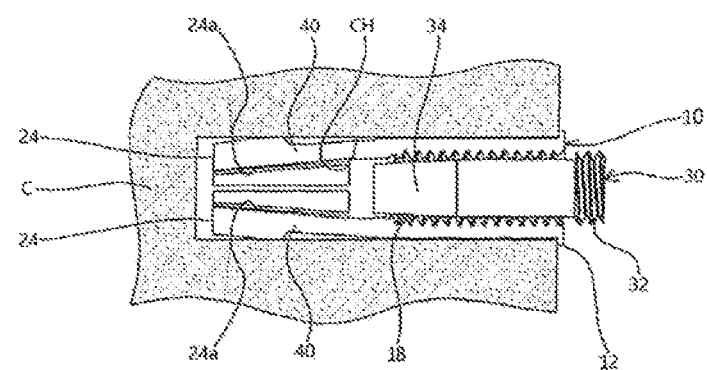
FIG. 7 is an explanatory view illustrating how to use the post-installed anchor.

As illustrated in FIG. 7, the post-installed anchor body 10 is inserted into the anchor insertion hole CH until the flange 12 thereof abuts around the opening entrance of the anchor insertion hole CH. Subsequently, the male screw body 30 is inserted into the anchor body 10 with the wedge part 34 at the tip thereof facing the anchor body 10.

As the male screw body 30 is inserted into the anchor body 10 accommodated in the anchor insertion hole CH, the male screw 32 of the male screw body 30 reaches the female screw 18 formed in the inner surface of the unexpandable part side of the anchor body 10. In this state, the tip of the rotary tool is engaged with the rotary tool engagement part 36 formed in the rear end surface of the male screw body 30 and rotated, with the result that the male screw body 30 is advanced while the male screw 32 of the male screw body 30 and the female screw 18 of the anchor body 10 are screwed with each other.

The male screw body 30 is thus advanced toward the tip of the anchor body 10, and the wedge part 34 at the tip of the male screw body 30 abuts against the inner surface 24a formed into a wedge surface inclined inward toward the tip part 24 side of the fixing part 20 of the expandable piece 40. As the male screw body 30 is advanced, the fixing part 22 of the expandable piece 40 is expanded outward against the spring force of the plate-like part 22 by wedge action between the wedge part 34 of the male screw body 30 and the inner surface 24a as the wedge surface of the fixing part 20 of the expandable piece 40. As a result, the outer surface of the fixing part 20 of the expandable piece 40 is pressed against the hole wall of the anchor insertion hole CH, whereby the post-installed anchor 1 is fixed in the anchor insertion hole CH.

Figure 8:
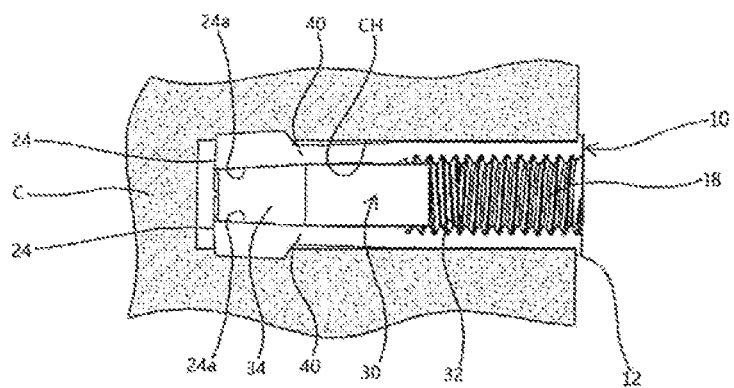
FIG. 8 is an explanatory view illustrating how to use the post-installed anchor.

As illustrated in FIG. 8, in a state where the post-installed anchor 1 is fixed to the concrete structure C, the female screw 18 of the anchor body 10 is opened at the opening entrance side of the anchor insertion hole CH, so that, for example, a screw for securing scaffolding or the like is screwed with the opened female screw 18 at the time of use of the post-installed anchor 1. That is, the axial direction length of the male screw body 30, the position of the male screw 32, and the axial direction length of the female screw 18 of the anchor body 10 are set so that the upper part of the female screw 18 remains as a screwable part in a state where the fixing part 20 of the expandable piece 40 is expanded to be fixed to the hole wall. This allows a screw for supporting scaffolding or the like to be screwed with the remaining screwable part of the female screw in the inner surface of the anchor body.

Figure 9:
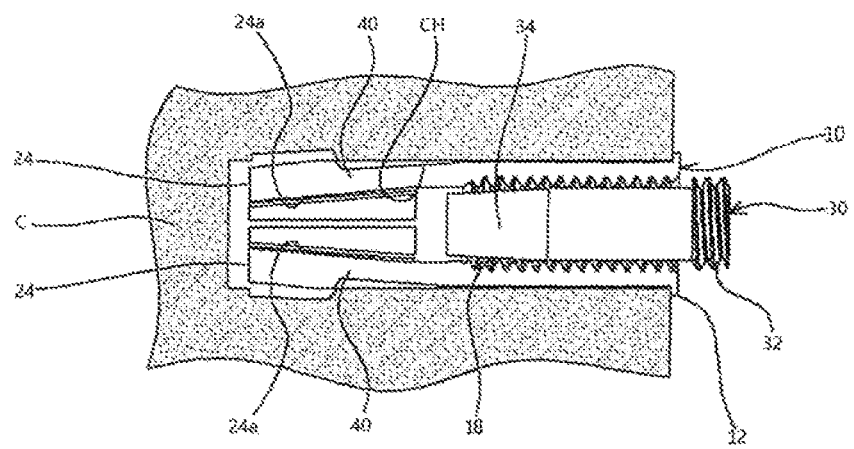
FIG. 9 is an explanatory view illustrating how to use the post-installed anchor.
Figure 10:
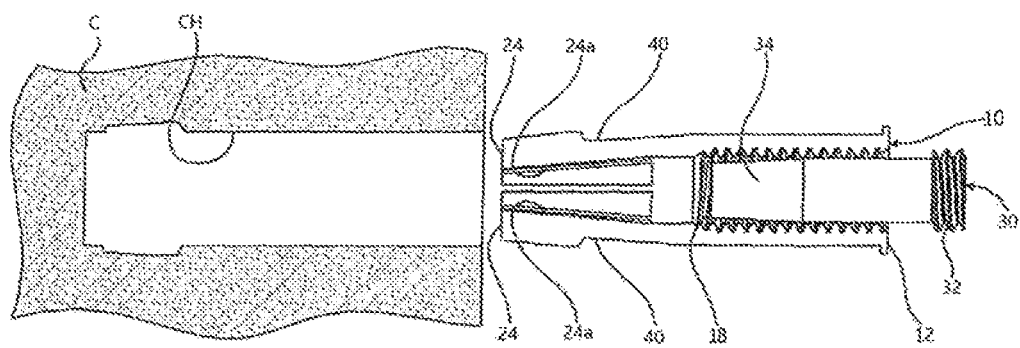
FIG. 10 is an explanatory view illustrating how to use the post-installed anchor.

As illustrated in FIG. 9, when the post-installed anchor 1 is recovered from the concrete structure C, the male screw body 30 is rotated reversely to be retracted. As the male screw body 30 is retracted, the fixing part 20 expanded outward is recovered to its original state by the spring force of the plate-like part 22. For ensuring the spring force of the plate-like part 22, the diameter of the plate-like part 22 is made smaller than that of the anchor body 10, the outer surface thereof is made to be a flat or curved surface, and the thickness thereof is made smaller than that of the fixing part 20. The expanded state of the fixing part 20 is smoothly eliminated by the spring force of the plate-like part 22, allowing the post-installed anchor 1 to be easily recovered from the anchor insertion hole CH.

Although the number of the expandable pieces 40 is six in the illustrated embodiment, it is not limited to six. However, the six expandable pieces 40 constitute a hexagonal shape, allowing the wedge part 34 to be linearly inserted although the shape constituted by the six expandable pieces 40 is close to a circle, which prevents the wedge part 34 from being inserted too tightly as well as enhancing the pull-out strength of the post-installed anchor 1.

As described below, according to the post-installed anchor 1 of the present invention, the diameter of the plate-like part 22 of each of the plurality of divided expandable pieces 40 is made smaller than that of the anchor body 10, the outer surface thereof is made to be a flat or curved surface, and the thickness thereof is made smaller than that of the fixing part. Thus, the expandable piece is kept within the elasticity region even when the fixing part 20 is expanded to a maximum extent, and the expandable piece is not plastically deformed even when the expanded expandable piece is closed. This significantly facilitates recovery of the post-installed anchor 1 from the anchor insertion hole CH.

INDUSTRIAL APPLICABILITY

According to the present invention, there can be provided a post-installed anchor capable of being used repeatedly and being easily removed.

REFERENCE SIGNS LIST

1: Post-installed anchor
10: Anchor body
12: Flange
14: Reinforcing rib
16: Slit
18: Female screw
20: Fixing part
22: Plate-like part
22a: Cut-off part
24: Tip part
24a: Fixing part inner surface
30: Male screw body
32: Male screw
34: Wedge part
36: Rotary tool engagement part
40: Expandable piece

The invention claimed is:
1. A post-installed anchor to be inserted and fixed in an anchor insertion hole formed in a structure, characterized by comprising:
   a cylindrical anchor body;
   expandable pieces obtained by dividing the tip side of the anchor body into a plurality of pieces by a plurality of slits which are formed on the tip side, leaving equal intervals in a circumferential direction and extending in the axial direction of the anchor body, the expandable pieces each having a plate part whose surface is formed into a flat surface and which has spring force, a fixing part formed at the tip of the expandable piece and having a larger thickness than that of the plate part, and an inclined part whose inner surface is gradually inclined inward toward the tip of the expandable piece;

a female screw formed in an inner surface of an unexpandable part side of the anchor body; and a male screw body formed into a substantially columnar shape that can be inserted into the anchor body, having a wedge part with a truncated conical shape at its tip, having a male screw screwed with a female screw formed in the anchor body at its rear end side, and having a rotary tool engagement part at its rear end surface, wherein the male screw body is advanced with the male screw of the male screw body screwed with the female screw of the anchor body to make the truncated conical shaped wedge part at the tip of the male screw body abut against the inclined part formed so that the inner surface thereof is gradually inclined inward toward the tip side of the expandable piece to expand the expandable piece by wedge action, pressing the outer surface of the fixing part against the hole wall of the anchor insertion hole, which thereby fixes the post-installed anchor in the anchor insertion hole, and the male screw body is retracted to close the expanded expandable piece by spring force of the plate part of the expandable piece for recovery and reuse.

2. The post-installed anchor according to claim 1, characterized in that in a state where the male screw of the male screw body is screwed with the female screw to expand the fixing part of the expandable piece to thereby fix the post-installed anchor to the anchor insertion hole, a screwable part of the female screw formed in the inner surface of the anchor body remains by a predetermined length from the upper end of the male screw body.

3. The post-installed anchor according to claim 1, characterized in that the plate part of the expandable piece is formed as a plate spring.

4. The post-installed anchor according to claim 1, characterized in that the number of the expandable pieces is six.

5. An anchor, comprising:

a cylindrical anchor body;

a plurality of expandable pieces formed by dividing a tip of the anchor body into a plurality of pieces by a plurality of slits, each of the expandable pieces having a plate part having a first thickness and a spring force, a fixing part having a second thickness, and an inclined part having an inner surface inclined inward, wherein the second thickness is larger than the first thickness;

a female screw formed in an inner surface of the anchor body; and a male screw body that can be inserted into the anchor body, having a wedge part at its tip, having a male screw screwed with the female screw, wherein the male screw body and the expandable pieces are configured so that the male screw body can be advanced to open the expandable pieces when the male screw of the male screw body is screwed with the female screw to expand the expandable pieces by a wedge action, pressing outer surfaces of the fixing parts against a wall of an anchor insertion hole, and the male screw body and the expandable pieces are configured so that the male screw body can be retracted to have the expanded expandable pieces move from an open position to a closed position for removal of the anchor.

6. The anchor according to claim 5, wherein the male screw body is configured so that, when the male screw of the male screw body is screwed with the female screw to expand the plurality of expandable pieces, a screwable part of the female screw remains by a predetermined length from the upper end of the male screw body.

7. The anchor according to claim 6, wherein the plurality of expandable pieces have equal intervals in a circumferential direction and extend in the axial direction of the anchor body.

* * * * *